United States Patent
Nguyen et al.

(10) Patent No.: US 8,310,671 B1
(45) Date of Patent: Nov. 13, 2012

(54) INTERFERENCE-FREE OPTICAL DETECTION FOR RAMAN SPECTROSCOPY

(75) Inventors: Quang-Viet Nguyen, Stone Ridge, VA (US); David G Fischer, Richfield, OH (US); Jun Kojima, Strongsville, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 230 days.

(21) Appl. No.: 12/893,627

(22) Filed: Sep. 29, 2010

(51) Int. Cl.
  *G01J 3/44* (2006.01)
  *G01J 3/30* (2006.01)
(52) U.S. Cl. ............................. 356/301; 356/315
(58) Field of Classification Search ................ 356/307, 356/301, 322, 327
  See application file for complete search history.

(56) References Cited

U.S. PATENT DOCUMENTS 5,194,913 A * 3/1993 Myrick et al. ............... 356/301
7,289,203 B2 * 10/2007 Frankel ........................ 356/301

* cited by examiner

*Primary Examiner* — Gregory J Toatley
*Assistant Examiner* — Shawn Decenzo
(74) *Attorney, Agent, or Firm* — Robert H. Earp, III

(57) ABSTRACT

An architecture for spontaneous Raman scattering (SRS) that utilizes a frame-transfer charge-coupled device (CCD) sensor operating in a subframe burst gating mode to realize time-resolved combustion diagnostics is disclosed. The technique permits all-electronic optical gating with microsecond shutter speeds (<5 μs), without compromising optical throughput or image fidelity. When used in conjunction with a pair of orthogonally-polarized excitation lasers, the technique measures time-resolved vibrational Raman scattering that is minimally contaminated by problematic optical background noise.

21 Claims, 6 Drawing Sheets

INTERFERENCE-FREE OPTICAL DETECTION FOR RAMAN SPECTROSCOPY

ORIGIN OF THE INVENTION

The invention described herein was made by employees of the United States Government and may be manufactured and used by or for the Government for Government purposes without the payment of any royalties thereon or therefore.

BACKGROUND

Historically, spectroscopy has referred to the study of wavelengths of visible light. Today, the term is used to refer to almost any measurement of a quantity as a function of either wavelength or frequency. Spectroscopy is often used in the field of astronomy and other remote sensing applications.

Raman spectroscopy is a technique used to study vibrational, rotational, and other low-frequency modes in a system. In practice, Raman spectroscopy relies on inelastic scattering of monochromatic light, e.g., via a laser. Upon interaction with molecules, the energy of incident laser photons is shifted up or down depending on the characteristic frequencies of the molecules excited. This shift in energy can be analyzed to yield information about the molecules in the system.

Spontaneous Raman scattering (SRS) is a linear scattering phenomena, which is typically very weak. As a result, one difficulty of Raman spectroscopy is separating the weak inelastically scattered light from the intense Rayleigh scattered laser light. Traditionally, holographic gratings and multiple dispersion stages were used in Raman spectrometers to achieve a high degree of laser rejection. Additionally, photomultipliers were often used as detectors for dispersive Raman setups. However, these photomultipliers were inefficient and resulted in poor spectral resolution. Today, instrumentation in Raman spectroscopy utilizes notch or edge filters for laser rejection and spectrographs.

One of the critical aspects of time-resolved SRS spectroscopy in combustion diagnostics is implementing a temporal gating scheme to reject optical background, thus increasing signal-to-noise ratio (SNR). Traditionally, experimenters have had two options: (1) electronic gating using an image intensifier; or (2) a mechanical shutter.

Many have chosen the image intensified CCD (charge-coupled device) (or ICCD) for electronic gating due to its superior nanosecond gating speed. However, there are several drawbacks with an ICCD, such as compromised image quality, lower dynamic range, and the possibility of permanent damage due to inadvertent bright sources of light.

A high-speed mechanical shutter by way of rotary optical choppers can provide a <10 µs gate at <30 Hz. With such a shutter system, one can take full advantage of the high dynamic range and quantum efficiency offered by conventional back-illuminated CCDs. On the other hand, 10 µs gating may not be acceptable for applications with higher levels of background. The use of a shutter often results in transmission losses of up to 50% due to internal relay optics and inherent timing jitter.

Regardless of the type of gating employed, laser-generated interference, such as laser-induced fluorescence (LIF) of $C_2$ carbons or polycyclic aromatic hydrocarbons (PAH), may still be problematic since these emissions occur simultaneously with Raman scattering. This problem is universal to all laser spectroscopy techniques, not just Raman diagnostics in combustion.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a spontaneous Raman scattering detection technology which utilizes a frame-transfer charge-coupled-device (CCD) sensor, in conjunction with a pair of pulsed lasers and multiplexed optical fiber collection, to realize time-resolved Raman spectroscopy of turbulent flames that is free from optical background noise or interference. The innovation is a significant advancement that redefines the experimental approach to multi-scalar diagnostics in combustion. The system does not utilize image intensifiers or mechanical shutters. The technology permits not only shorter temporal gating (down to <1 µs, in principle) but also higher optical throughput without sacrificing image quality, thus resulting in a substantial increase in measurement signal-to-noise ratio.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
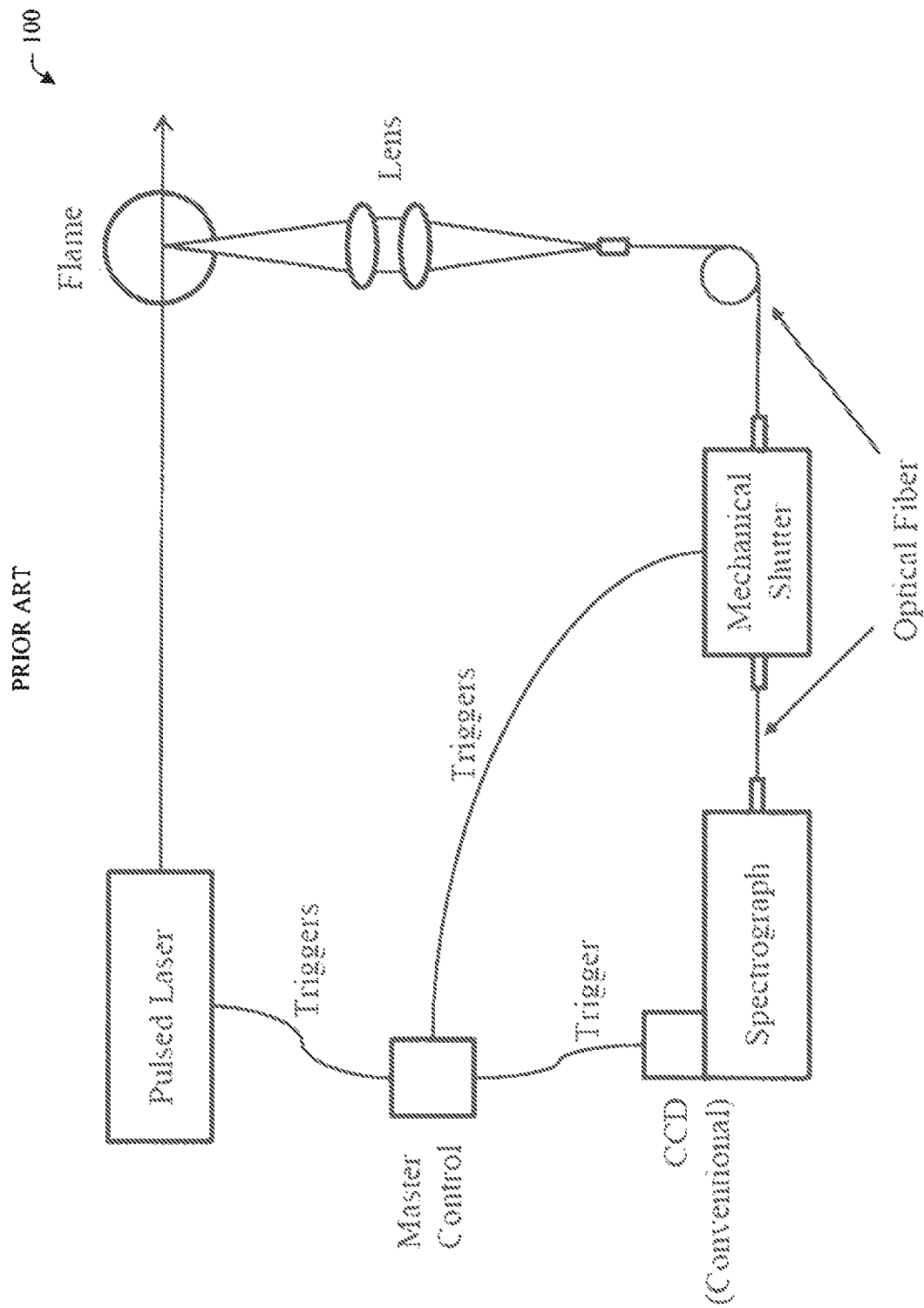
FIG. 1 illustrates a conventional high speed shutter system for optical gating.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

Accurate experimental measurement of spatially and temporally resolved variations in chemical composition (species concentrations) and temperature in turbulent flames is vital for characterizing the complex phenomena occurring in most practical combustion systems, such as gas turbine engines, power utility boilers, and internal combustion engines. These diagnostic measurements are called multi-scalar because they are capable of acquiring multiple scalar quantities simultaneously. Multi-scalar diagnostics also play a critical role in the area of computational code validation. In order to improve the design of combustion devices, computational codes for modeling turbulent combustion are often used to speed up and optimize the development process. The experimental validation of these codes is a critical step in accepting their predictions for engine performance in the absence of cost-prohibitive testing. The innovation can significantly improve the quality and ease of collection of Raman data, through the use of a novel detection architecture with remarkable noise removal capabilities.

As stated above, non-intrusive laser diagnostics play a major role in combustion characterization and code validation. In particular, spontaneous Raman scattering (e.g., inelastic light scattering from rotating and vibrating molecules) has been a popular method of probing flames because it is practically the only technique available today that provides spatially and temporally resolved multi-scalar measurements. Although spontaneous Raman scattering (SRS) spectroscopy is routinely used for combustion diagnostics, in accordance with conventional systems, accurate determination of flame characteristics from SRS remains a challenge due to inherently weak signals.

One of the most critical aspects of setting up a time-resolved SRS diagnostic system is the temporal optical gating scheme. A short optical gate is necessary in order for weak SRS signals to be detected with a good signal-to-noise ratio (SNR) in the presence of strong background optical emissions. This time-synchronized optical gating is a classical problem even to other spectroscopic techniques such as laser induced fluorescence (LIF) or laser-induced breakdown spectroscopy (LIBS). Traditionally, experimenters have had basically two options for gating: (1) an electronic means of gating using an image intensifier (II) before a CCD (charge-coupled device); or (2) a mechanical shutter.

Many groups have chosen the II for Raman diagnostics due to its nanosecond gating capability. However, the use of an II for Raman diagnostics often means a compromise in data quality. Due to photon spread from proximity focusing in the internal fiber-optic coupling plate between the II and the CCD array, the spatial resolution of the CCD array, and thus spectroscopic resolution, is compromised. In addition, due to avalanche gain and space-charge effects, the dynamic range of an II is limited to about 1000:1 (about 10 bits) for most practical applications. This relatively low dynamic range, or output saturation limit, can be problematic in cases where large differences exist in signal intensity of one species to another (e.g., a hydrocarbon vs. $CO_2$ in fuel rich flames). Finally, it has also been reported that II-CCD's can be vulnerable to bright laser sparks or other inadvertent bright sources of light and possibly damaged.

As illustrated in FIG. 1, a conventional high-speed mechanical shutter system is a gating method that can provide microsecond optical gating. The combination of digitally-synchronized high- and low-frequency rotary optical choppers with a fast electro-mechanical leaf shutter can provide a 10 μs gate at typical repetition rates required for pulsed-laser measurements (10-30 Hz). With the shutter system, one can take full advantage of the high dynamic range ($10^7$/e-typical) and high quantum efficiency (>90% typically) offered by a conventional cooled highly-sensitive CCD. On the other hand, the use of a shutter results in a transmission loss of about 50%, due to internal coupling and chopping losses. The shutter system also has a certain amount of jitter, which requires additional optics for monitoring and correction. Further, an electro-mechanical leaf-shutter has a relatively short life-time under typical usage cycles in diagnostic experiments.

Regardless of the type of gating employed, laser-generated optical interference (e.g., laser-induced fluorescence from molecules involved) may still be a problem since such phenomena occur simultaneously with Raman scattering within the nanosecond time window. To combat this issue, an interference cancellation technique for Raman spectroscopy has been proposed. One basic concept applied to the subject invention in a different system architecture, involves isolating the highly polarized Raman scattering signal from the unpolarized laser-induced fluorescence. In one traditional system, an attempt was made to apply this principle in isolating the Raman signal from the optical interference on a single-shot basis using II-CCD cameras with a polarizing beamsplitter. This attempt was not successful, however, because of reduced optical throughput (typically >50% loss at polarizer) and insufficient spectral data quality due to the use of an II.

The innovation described and claimed herein employs polarization-resolved spectroscopy to achieve interference-free analysis of spontaneous Raman scattering. By way of summary and not limitation, a basic concept of the innovation discloses an efficient method of isolation of a highly polarized vibrational SRS signal from the unpolarized interference.

The innovation disclosed and claimed herein is a system (and method) for isolating true Raman spectral signals from flames using a single CCD detector. As will be understood upon a review of the specification, in aspects, the technology does not use an image intensifier or a mechanical shutter.

The diagnostic methodology of the innovation, discloses a new concept or scheme of providing spectral analysis. The subject innovation describes a new paradigm for conducting time-resolved Raman spectroscopy which employs two primary optical devices: a pair of pulsed lasers (each producing nanosecond pulses) and a frame-transfer CCD sensor.

Frame-transfer CCD sensors have been historically used to capture fast (e.g., microsecond time scale) transient events, such as Bose-Einstein Condensate phenomena, over a short period of time (e.g., milliseconds). By their operation, the sensor area is exposed for a certain time and the charge is then transferred to the frame transfer area, or masking area, row by row and is read out via a gain register or serial register. This is called frame-transfer readout or kinetics readout. It will be appreciated that the notion of using frame-transfer readout for gating out flame background emissions in Raman spectroscopy has not been employed in conventional systems.

Moreover, it will be appreciated that the use of fast frame-transfer readout coupled with a polarization-resolved laser excitation provides a very effective way of isolating the true Raman signal from laser-generated optical interferences in most any combustion environment in principle without employing multiple CCD detectors or a polarizer on the detection side.

Figure 2:
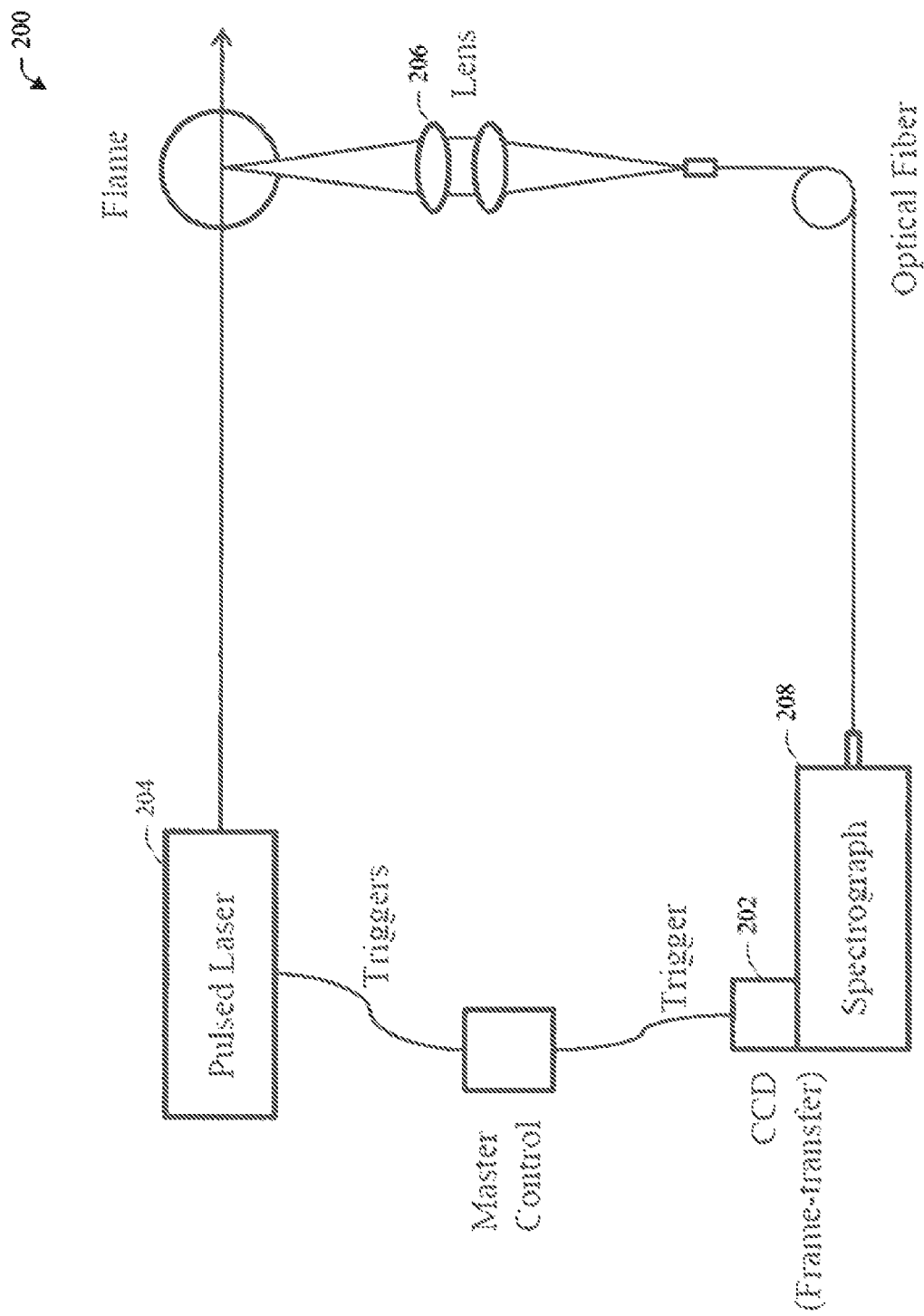
FIG. 2 illustrates an example subframe exposure shift (SES) system in accordance with aspects of the innovation.

FIG. 2 illustrates an example subframe exposure shift (SES) system 200 in accordance with aspects of the innovation. As shown, the system 200 illustrates a schematic of Raman spectroscopy in flames that employs a frame-transfer CCD sensor 202 and a pulsed laser 204. In this example, a nanosecond (e.g., 10-100 ns) long laser pulse excites major species molecules (such as N2, O2, CO2, H2O, etc.) in flames. Raman scattering from these molecules is collected by a lens assembly 206 and focused onto an optical fiber (e.g., a single fiber or fiber bundle arranged in a packed round or alternative geometry), which guides the scattered light to the entrance slit of a spectrograph 208.

Unlike the mechanical shutter-based system (100 of FIG. 1), the innovation does not have optical transmission loss associated with the gating system 200 of FIG. 2. The scattering can also be directly focused onto the slit entrance of the spectrograph 208 if such an arrangement is preferred.

Figure 3:
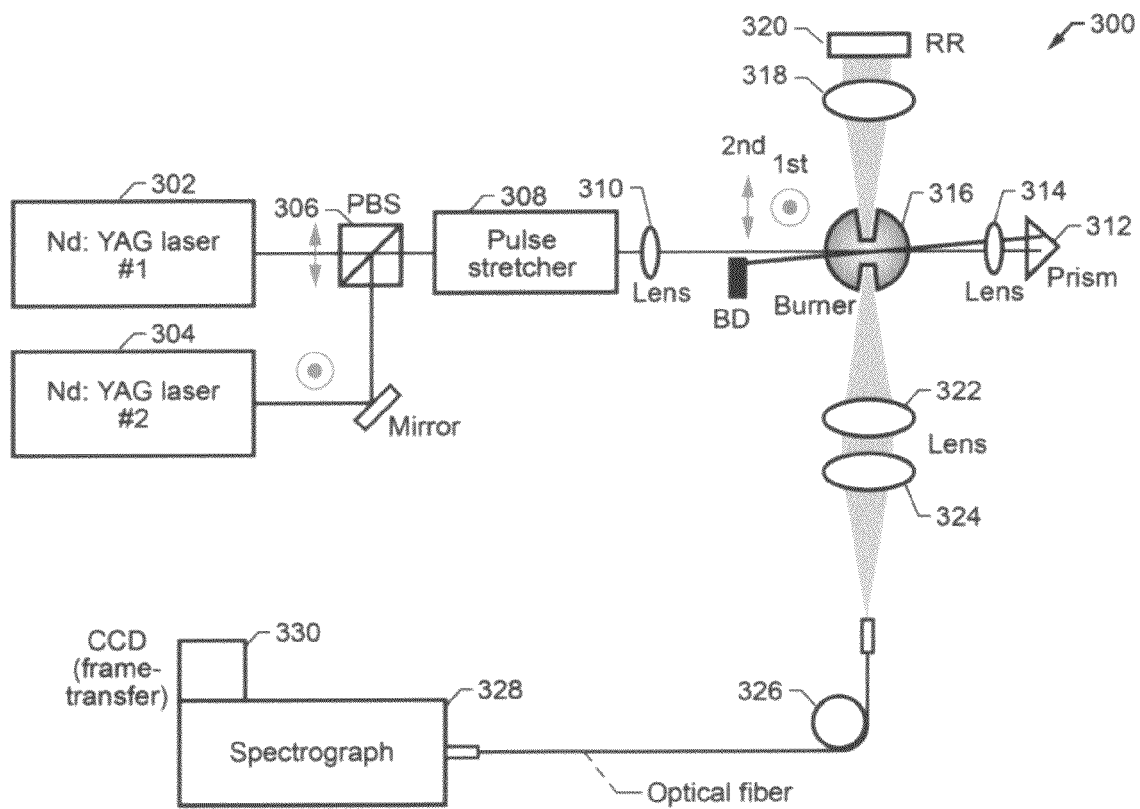
FIG. 3 illustrates an example of interference-free Raman scattering spectroscopy in accordance with aspects of the innovation.

Referring now to FIG. 3, an example system architecture 300 is illustrated, in accordance with aspects of the innovation. This example system is a double-pulse polarization-resolved laser Raman spectroscopy system, specially constructed for interference-free Raman signal acquisition using a frame-transfer CCD. As shown, outputs of two sequential Q-switched Nd:YAG lasers 302, 304 are spatially superimposed with a polarizing beamsplitter (PBS) 306. The outputs are sent through polarization-insensitive pulse-forming optics (or pulse stretcher) 308, providing a pair of orthogonally-polarized pulses at the desired wavelength such as 532 nm, with the desired temporal pulse width such as 75~100 ns, and with the desired pulse energy such as 500~1000 mJ/pulse. The pair of laser pulses is focused onto a chemical fluid sample such as a combustion flame 316 by a focusing lens 310, in the case of a spatially-resolved point-wise measurement. In operation, the laser pulses excite combustion products in a flame 110. A right-angle folding prism 312 and lens 314 can redirect the incident beams back into the probe volume, effectively doubling the excitation energy.

The Raman scattering signal, laser-induced fluorescence, and flame optical emissions (i.e., interference) from the probe volume are collected by a lens assembly 322/324, oriented 90 degrees to the incident beams, which images the probe volume onto the core of an optical fiber 326. Another achromatic lens 318 and retro reflector 320 can effectively double the collection solid angle of the primary lens 322. An optical fiber 326 guides the collected light to the entrance of a spectrograph 328. The input light is then dispersed by the grating of the spectrograph 328 and focused onto a frame-transfer CCD sensor 330. The innovation does not include any mechanical shutter system or image intensifier prior to detection.

In procedures relating to aspects of the innovation, two fiber assemblies 326 could alternately be used. The first includes, on one end, a bundle of seven 100 μm core silica fibers in a close-packed geometry with a 400 μm effective diameter, while the distal end is configured as a 1×7 linear array aligned with the slit axis of a 1:1 imaging spectrograph 328. In this example, the measurement probe volume is approximately 400 μm long×400 μm in diameter.

The second fiber assembly includes a single 100 μm core fiber. The collection fiber 326 guides the scattered light to an f/1.8 holographic imaging lens spectrograph 328 equipped with a long-wave pass filter and a volume-transmission grating having 17 nm/mm average reciprocal linear dispersion, and fitted with a back-illuminated FT-CCD sensor 330. In this example, the sensor 330 has 512×512 pixels (16 μm square) with 16-bit digitization. The spectrograph 328, with a 100-μm entrance slit or no slit, and the FT-CCD sensor 330 are optimally assembled to capture a spectrum with relatively low resolution (e.g., 0.24 nm/pixel) over the range from 566 to 688 nm.

Figure 4:
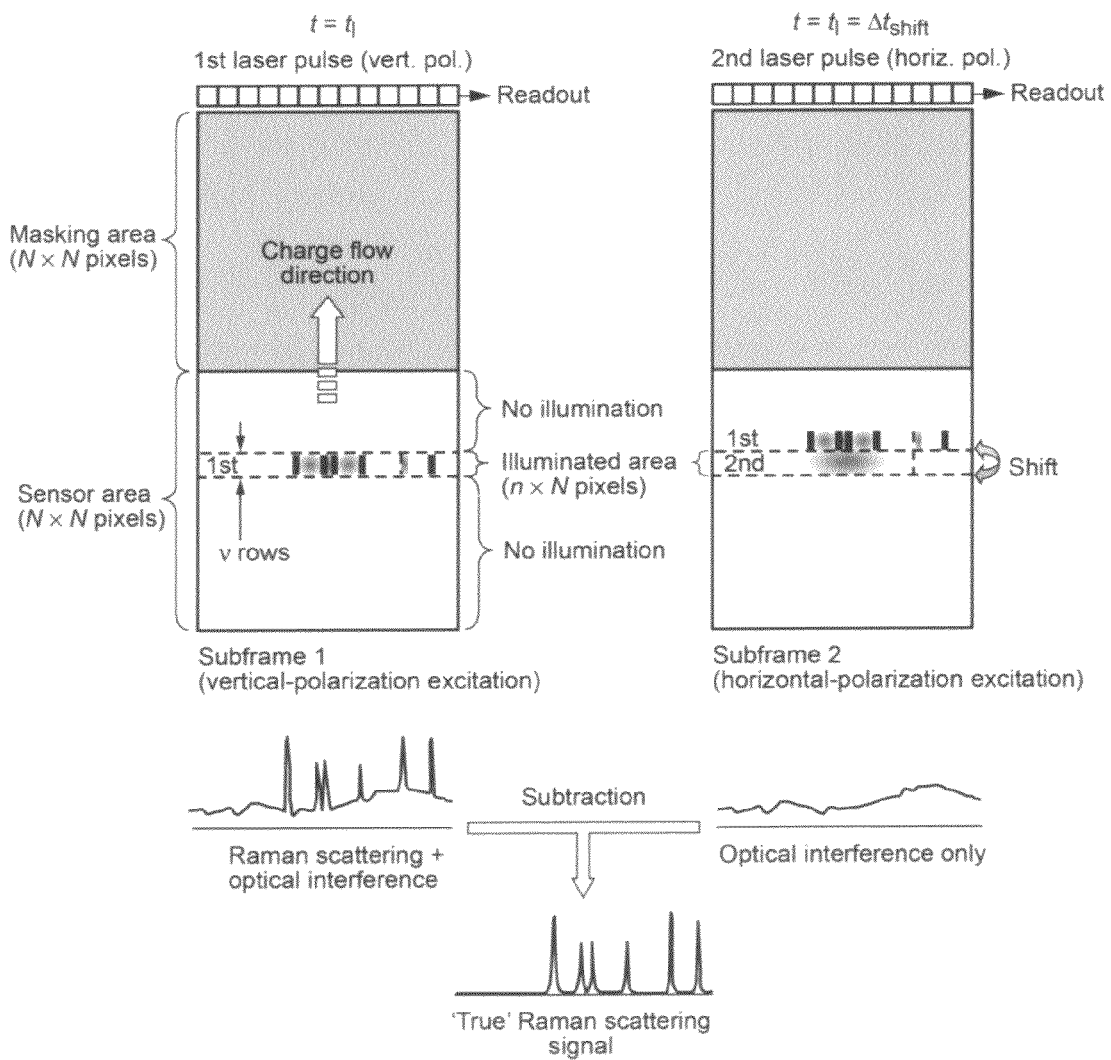
FIG. 4 illustrates an example of true spectral analysis under operation of interference-free Raman scattering spectroscopy in accordance with aspects of the innovation.

FIG. 4 illustrates the principle of true Raman spectral analysis, which can be achieved by operating a frame-transfer CCD (FT-CCD) at the fastest pixel-shifting rate with a synchronized pulsed laser. As shown in FIG. 4 (upper left), the FT-CCD sensor (330 of FIG. 3) is only partially illuminated (n rows); the incident illumination is limited by the size of the optical fiber assembly (326 of FIG. 3), preventing light from falling on the rest of the sensor. This illuminated area is called a 'subframe'. Each row is rapidly and continuously shifted toward the masking area (e.g., physically masked and thus no light sensitivity) until this electron charge "storage" area is full. This is called 'exposure-shift' mode. Thus the spectral information, encoded as an electron charge distribution within the subframe, is constantly pushed forward or transferred to the storage area and eventually read out to a register.

During this period, an initial laser excitation pulse with vertical polarization interrogates a flame of interest, initiating Raman scattering as well as optical interference dominated by induced-fluorescence. Since the unmasked CCD pixels (e.g., silicon) are always light sensitive, this mixture of scattering and fluorescence is captured within the subframe (indicated as Subframe #1 in FIG. 4) in the form of a contaminated spectrum. While this series of events—laser excitation, scattering, photo-sensing, and electron-discharge—takes place within a time period of roughly 100 nanoseconds, shifting of the resulting electrons generated within the subframe (n rows) takes relatively longer time, typically microseconds.

For a state-of-the-art FT-CCD device, the pixel shift rate in the vertical direction can be as fast as 300 ns/row for a 512×512 pixel sensor. If an optical fiber with a 100 μm core is the input to a 1:1 imaging spectrograph and the pixel size of the FT-CCD sensor is 16 μm/pixel, the illuminated area is approximately 7 pixels height. Thus, in this example, the subframe has a 7 pixel height. In this case, for a 512×512 pixel sensor, the sensor area will be divided into 512 rows/7 rows=73 subframes. The transfer rate can be as fast as 300 ns/row×7 rows=2.1 μs per subframe. This means that all of the pixels in one subframe would be shifted out of the illuminated area into the non-illuminated area in 2.1 μs.

Here the illuminated area of the sensor constantly receives light from the flame. In the absence of a laser pulse, this background flame emission is essentially blackbody radiation (and flame chemiluminescence spectral emissions) from the probe volume. CCD pixels exposed to this background flame emission accumulate additional electron charges. Once the subframe with the Raman spectral information is shifted out of the illuminated area, there will be essentially no optical noise that can interfere with the signal. At this point, any potential optical interference is "gated out." Therefore, the subframe transfer rate essentially defines the 'temporal gate width' of the detection system. Hereafter this gating method is denoted as subframe-exposure shift gating, or SES gating.

It should be noted that a trade-off relationship exists between the gate width (i.e., subframe transfer rate) and signal level. As the fiber core diameter (or size of the fiber array at the entrance slit) is increased, the signal level increases, but the size of the illuminated area also increases (i.e., there are a greater number of rows). This results in a slower subframe transfer rate and, consequently, a longer gate width. As a result, the size of the subframe must be optimized for each unique experimental condition and diagnostic configuration (e.g., laser power, collection solid angle, and f/number of spectrograph).

With continued reference to FIG. 4, Raman scattering and unwanted fluorescence excited by the initial vertically-polarized laser pulse (single shot) is now captured in Subframe #1, which is then shifted out of the illuminated area over a time $\Delta t\_shft$ (=subframe transfer rate). This subframe transfer rate defines the temporal gate width, while the temporal resolution of the Raman scattering measurement is solely defined by the temporal duration of the laser pulse (approx. 70 nanoseconds).

It is important understand that when a flame receives two orthogonally polarized laser pulses, the vibrational Raman scattering can be fully observed only at the orientation that is normal to the incident light polarization plane. This is the case for 90° scattering of a vertically-polarized incident beam as illustrated in FIG. 3. All unpolarized interferences, including laser induced fluorescence and flame emissions, unlike the vibrational Raman signals, are observed regardless of the polarization state of the incident laser pulses.

Immediately after the FT-CCD sensor shifts Subframe #1 out of the illuminated area, a second laser pulse with horizontal polarization interrogates the flame, which instantly generates laser-induced fluorescence but not Raman scattering at the detector, due to the above-mentioned nature of Raman scattering. Since Subframe #1 has been shifted out, this fluorescence emission falls onto Subframe #2, which is now within the illuminated area as shown in FIG. 4 (upper right). Again, continuous flame luminescence background is also collected in Subframe #2 over the same period as Subframe #1. After the period of Δt_shft (sec), Subframe #2 is shifted out of the illuminated area, and thus the detected spectral data is preserved. A post-processing subtraction of these two spectra allows the unwanted interference component to be cancelled out, thus producing a true Raman signal on a single-shot basis.

In summary, when a flame receives two orthogonally polarized, but otherwise identical, laser pulses, Raman scattering is only observed for the vertically-polarized excitation pulse at the orientation described in FIG. 3. The unpolarized laser-generated interference is observed regardless of the polarization state of the excitation pulse. If the two orthogonally-polarized laser pulses are separated in time so that they just fall onto a pair of consecutive subframes on the FT-CCD sensor while it is running in the 'exposure-shift' mode, subtracting the one (laser-generated interference only) from the other (Raman signal plus interference emissions) results in the true Raman spectrum as illustrated in FIG. 4.

It is understood that, in this example, the laser pulse pair must be separated in time by at least the subframe transfer time, Δt_shft (sec) in order to be captured on two consecutive subframes without crosstalk. Also, Subframe #1 and #2 can be selected from any two consecutive subframes among the defined subframes within the sensor area.

In addition, supplemental physical masks can be integrated into the camera system, above a particular region of the CCD sensor array, serving as a shield for the respective light-sensitive pixels. This would further limit stray light reaching the spectrograph. The same effect can be achieved by adjusting the position of the CDD chip so that the fiber image lies exactly at the bottom edge of the built-in physical mask already provided by the FT-CCD.

Figure 5:
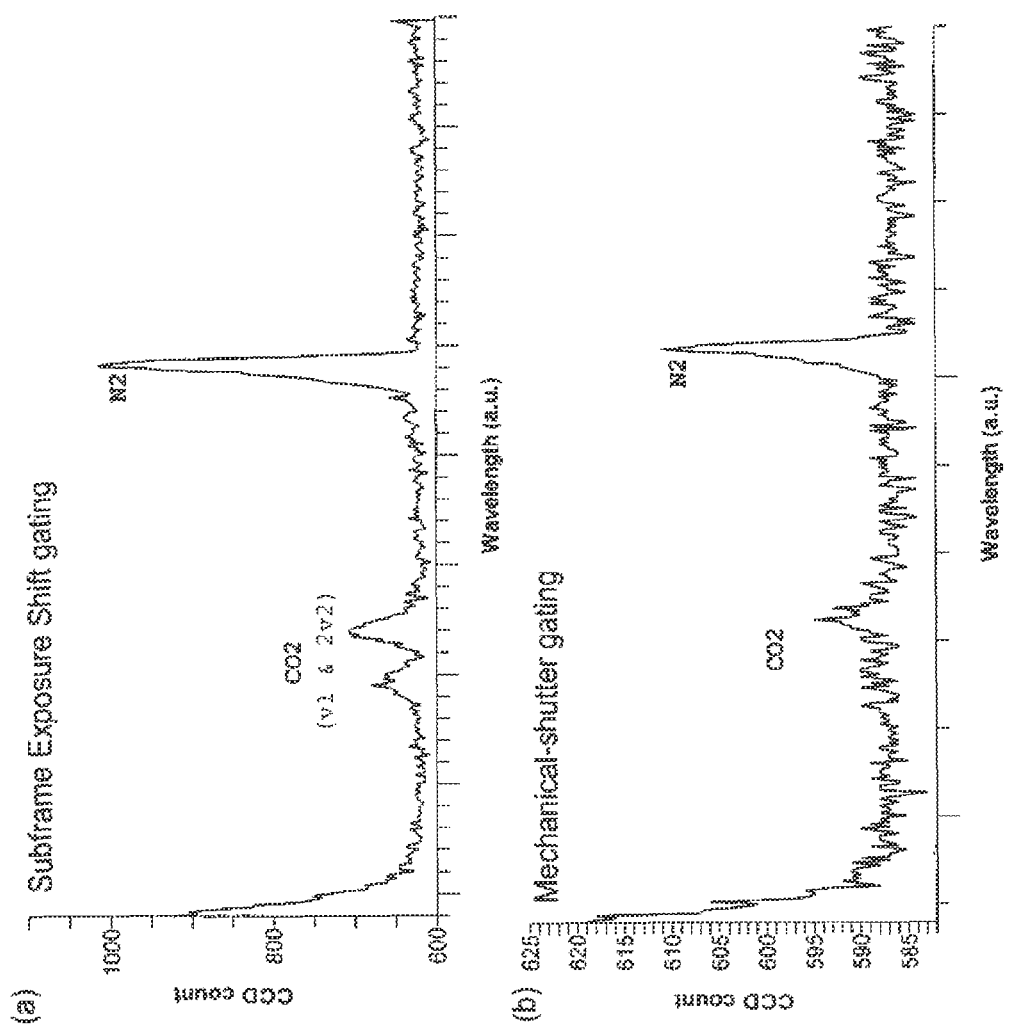
FIG. 5 illustrates a demonstration of subframe exposure-shift gating in Raman spectroscopy in accordance with aspects of the innovation.

In operation, with results shown in FIG. 5, the optical gating scheme based on subframe-exposure shift gating using a FT-CCD (hereafter denoted as subframe-exposure shift gating) was demonstrated for a stoichiometric methane-air flame. The laser pulse energy was 500 mJ/pulse. The plots only show a portion (from 540 nm to 640 nm) of the Raman spectrum observable in flames. The gate width of both measurements is approximately 24 microseconds. The result shows that the quality of the Raman spectrum measured with the subframe-exposure shift (SES) gating method (top) surpasses the equivalent measurement with a conventional mechanical shutter system (bottom). In particular, the inherently weak Raman scattering from carbon dioxide ($CO_2$) is easily observed with the SES gating method. This increase in signal-to-noise ratio is mainly due to the high optical throughput that was achieved by eliminating mechanical and optical components normally associated with a mechanical shutter. It will be understood in sections below that the subframe-exposure shift gating is critical to the success of the innovated interference-free Raman scattering detection architecture.

Figure 6:
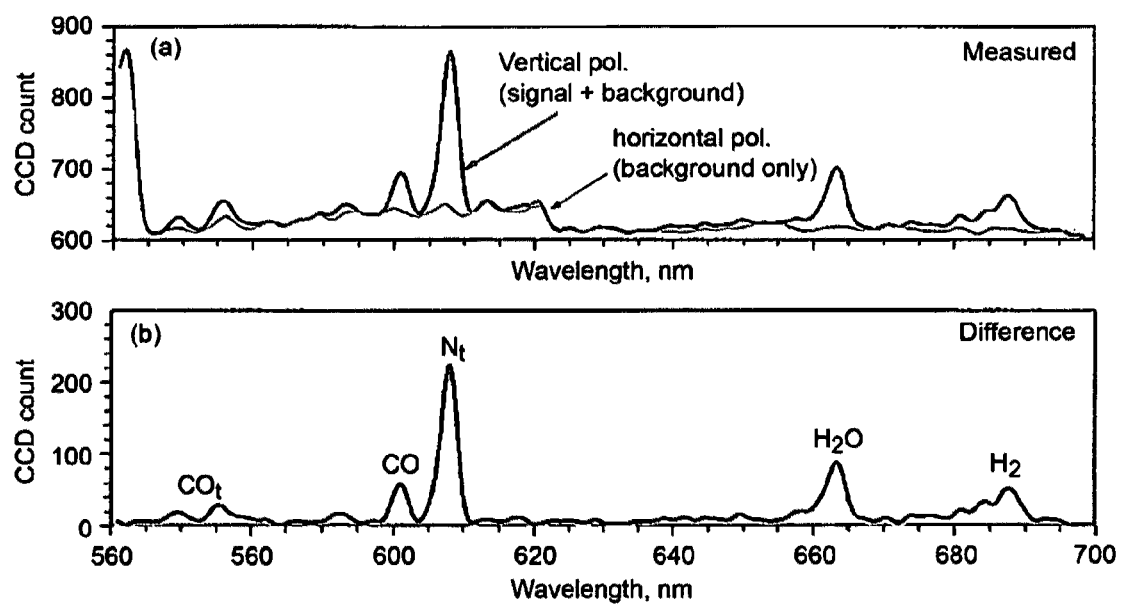
FIG. 6 illustrates a demonstration of single-shot detection and spectral analysis in interference-free Raman scattering spectroscopy in accordance with aspects of the innovation.

Referring now to FIG. 6, in operation, the innovated interference-free Raman spectroscopy technique was applied to a heptane-air flame. The experiment was constructed as illustrated in FIG. 3. The scattering was detected using a FT-CCD operated in subframe-exposure shift mode, as described previously, providing a 27-microsecond-wide gate corresponding to the fiber arrangement used in this example experiment. FIG. 6a (top) shows recorded spectral data of the sample excited by both vertically and horizontally polarized laser pulses. The vertical pulse excites both the Raman scattering and the optical interferences, while the horizontal pulse excites only the optical interference.

The difference between the two spectra (i.e., Subframe #1 and #2) of FIG. 6a results in an optical background-corrected spectrum as shown in FIG. 6b (bottom). The corrected spectrum clearly shows only Q-branch peaks of the combustion products such as carbon dioxide ($CO_2$), carbon monoxide (CO), nitrogen ($N_2$), water vapor ($H_2O$), or hydrogen ($H_2$) above a relatively flat baseline.

As described herein, the innovation could benefit the development of advanced combustion engines for aerospace, defense, and civilian systems, etc. through either direct diagnosis of the systems or validating computational codes. The following is provided as an overview and not intended to limit the scope of the innovation described and claimed herein. Generally, the innovation describes fast electronic gating systems (and methods) for spectroscopy. In accordance therewith, microseconds (~2 μs) gating is achievable. Additionally, the systems described need not employ mechanical moving parts.

The systems of the innovation are durable and last as long as the CCD sensor itself lasts. The innovation offers simple but, precise timing control that is highly reproducible with no timing jitter. In accordance with the described architecture, there is no need for an expensive, fragile image intensifier for gating. This allows the use of high-resolution back-illuminated CCD sensors without sacrificing image quality or spectral resolution.

In aspects, the innovation can achieve a higher signal-to-noise ratio (factor of ~5) due to higher optical throughput and potentially shorter gate width. It can enable time-, space-, and polarization-resolved Raman spectroscopy with a single detection sensor and without optical loss in the detection train (e.g., quantum efficiency >90%). Further, the systems permit real-time optical background correction (e.g., removal of flame emission and laser-generated fluorescence).

As described supra, the innovation enables true Raman signal measurements for more accurate combustion diagnostics (e.g., multiscalar information: temperature and chemical gas composition). As well, the systems allow more compact Raman detection system architecture and are beneficial for other spectroscopy and imaging modalities such as coherent anti-Stokes Raman spectroscopy (CARS) or laser-induced breakdown spectroscopy (LIBS).

It is noteworthy that the subtraction process associated with the innovated system extracts only the vibrational Q-branches of the Raman signal. Due to this fact, the innovated technique may significantly simplify the technical challenges of the classical Raman signal calibration process typically needed to account for Raman spectral crosstalk correction by eliminating the ubiquitous spectral interference emanating from the pure rotational $H_2$ Raman lines, and the lines from the smaller O/S-branches of $N_2$, $O_2$, or $CO_2$. What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for capturing a Raman scattering component and cancelling out a background fluorescence component of a sample, comprising:
   a first and a second pulsed laser that excites molecules in a sample;
   a frame-transfer charge-coupled device (FT-CCD) having an active area and operating in a continuous pixel-shift mode;
   an optical fiber that carries scattered laser light from the sample to the FT-CCD active area and projects the scattered laser light onto a portion of the active area, thus creating a subframe with minimal pixel height;
   wherein the Raman scattering component and background fluorescence induced by the first incident laser pulse is detected by a first subframe while the background-only component induced by the second incident laser pulse is detected by a second subframe; and
   whereby the system captures a pure Raman scattering component by cancelling out the background fluorescence component contained in the first subframe by the background-only component measured in the second subframe.

2. The system of claim 1, wherein the first and second pulsed lasers have a same-wavelength and are orthogonally-polarized.

3. The system of claim 2, wherein the two laser pulses are collinearly overlapped.

4. The system of claim 3, further comprising an exposure-shift sequence of two consecutive subframes synchronized with the two orthogonally-polarized laser pulses.

5. The system of claim 4, wherein the first laser produces a pulse whose polarization plane is normal to the light collection axis.

6. The system of claim 5, wherein the second laser produces a pulse whose polarization plane is parallel to the light collection axis.

7. The system of claim 6, wherein the two incident laser pulses have an inter-arrival time delay, that is, the second laser pulse arrives at the sample volume a few microseconds or less after the first pulse has arrived.

8. The system of claim 1, wherein the sample is a chemical fluid sample.

9. The system of claim 8, wherein the chemical fluid is a combustion flame.

10. The system of claim 1, wherein no mechanical shutter is used for gating.

11. The system of claim 10, wherein the FT-CCD operates at a fast vertical shift speed that minimizes exposure time of the subframe.

12. The system of claim 11, wherein when the laser light from the lasers is projected onto a portion of the FT-CCD active area, thus creating a subframe with minimal pixel height, with the rest of the active area receiving no light.

13. A method of time-resolved spectroscopic detection of Raman scattering in the presence of optical interference, comprising:
   exciting molecules in a sample;
   spatially limiting an illumination subframe on a detection sensor chip, wherein the limited illumination subframe has minimal pixel height;
   operating a frame-transfer charge-coupled device (FT-CCD) in a continuous pixel-shift mode, minunizing exposure time of the limited illumination subframe;
   synchronizing two consecutive limited illumination subframes, wherein a Raman scattering signal and a background interference induced by a first incident laser pulse having a polarization direction normal to a corresponding light collection axis is detected by a first of two consecutive subframes while a background interference induced by a second incident laser pulse having a polarization direction parallel to a corresponding light collection axis is detected by the second subframe; and
   capturing pure Raman scattering signal by removing optical background interference via post-process subtraction of a spectrum recorded in the second subframe from a spectrum recorded in the first subframe.

14. The method of claim 13, wherein the molecules are excited via a pair of same-wavelength orthogonally-polarized pulsed lasers and the sample is a chemical fluid.

15. The method of claim 14, wherein the chemical fluid is combustion flame.

16. The method of claim 14, wherein the chemical fluid is reacting flow.

17. The method of claim 14, wherein a subframe exposure shift serves as a fast optical gate for detection.

18. The method of claim 17, wherein temporal width of the fast optical gate for detection is essentially equal to the subframe transfer rate, which is a time to shift one subframe out of the active exposure area; which further defines and is equal to an inter-arrival time delay of two consecutive laser pulses.

19. The method of claim 14, wherein the temporal width of an optical gate is smaller than time scale of a fluid flow but greater than a laser pulse temporal width.

20. A system for detection of pure Raman scattering, comprising:
   means for generating a pair of same-wavelength orthogonally-polarized laser pulses that excite molecules in a chemical fluid;
   means for spatially limiting an illumination area on a detection sensor chip, resulting in a subframe having minimal pixel height, wherein the rest of the sensor chip's active area receives negligible light; and
   employing a detection sensor that is a frame-transfer charge-coupled device (FT-CCD) operating in a continuous pixel-shift mode at the fast vertical shift speed for minimizing exposure time of the subframe, wherein, the exposure-shift sequence comprises two consecutive subframes which are synchronized with the two sequential orthogonally-polarized laser pulses, in which;
   a Raman scattering signal and a background interference induced by first incident laser pulse having a polarization direction normal to a light collection axis is detected by the first subframe while a background interference induced by the second incident laser pulse having a polarization direction parallel to the light collection axis is detected by the second subframe; and
   means for capture of the pure Raman scattering signal via the first and second subframes.

21. The system of claim 20, wherein the means for capture includes means for removing the optical background interference through post-process subtraction of a spectrum recorded in the second subframe from a spectrum recorded in the first subframe.

* * * * *